United States Patent [19]
Fahie et al.

[11] Patent Number: 5,960,061
[45] Date of Patent: Sep. 28, 1999

[54] EMERGENCY TELEPHONE NUMBER ALERTING DEVICE

[75] Inventors: Reginald R. J. Fahie; Eamonn Oldham, both of Dartmouth; Doug Dares, Truro; Lawrence Hicks, Fall River, all of Canada

[73] Assignee: Site-Light Inc., Dartmouth, Canada

[21] Appl. No.: 08/931,986

[22] Filed: Sep. 17, 1997

Related U.S. Application Data

[60] Provisional application No. 60/026,217, Sep. 17, 1996.

[51] Int. Cl.⁶ .................................................. H04M 11/04
[52] U.S. Cl. ............................... 379/37; 379/45; 455/404
[58] Field of Search .................................. 379/37, 38, 39, 379/40, 42, 45; 455/404, 521, 456

[56] References Cited

U.S. PATENT DOCUMENTS

| | | |
|---|---|---|
| 4,935,951 | 6/1990 | Robinson et al. . |
| 4,993,058 | 2/1991 | McMinn et al. . |
| 5,012,507 | 4/1991 | Leighton et al. . |
| 5,121,126 | 6/1992 | Clagett ..................................... 455/456 |
| 5,748,706 | 5/1998 | Morgan et al. ............................ 379/37 |

FOREIGN PATENT DOCUMENTS 1326920  2/1994  Canada .

*Primary Examiner*—Curtis A. Kuntz
*Assistant Examiner*—Melus Ramakrishnaiah
*Attorney, Agent, or Firm*—R. Craig Armstrong

[57] ABSTRACT

An emergency telephone number alerting and guidance process to guide emergency responders to the exact scene of an emergency declared by dialing the emergency services notification (ESN) telephone number consisting of the following steps: a decoder detecting the ESN telephone number as it is dialed on the telephone instrument; the decoder communicating via a low power, unlicenced radio link to a remotely located guidance beacon assembly informing it of the presence of the ESN detection; and, the beacon responding to the ESN detection signal by initiating a distress guidance signal. The distress guidance signal comprising of a visual strobe light and a pulsating radio signal which signal may be used by a radio direction finder. A system to implement this guidance process consisting of a decoder and guidance beacon assembly.

5 Claims, 3 Drawing Sheets

EMERGENCY TELEPHONE NUMBER ALERTING DEVICE

This application claims benefit of U.S. provisional application serial No. 60/026,217, filed Sep. 17, 1996.

FIELD OF THE INVENTION

The invention relates to auxiliary notification of emergency conditions present in residential, commercial, institutional or industrial settings as determined by detection of the appropriate emergency services notification (ESN) telephone number.

BACKGROUND OF THE INVENTION

Throughout most of North America as well as in other parts of the world, the three digits "911" have been selected as the Emergency Services Notification telephone number. Other countries use different sequences of numbers for the same purpose. For example, "111" is used in the United Kingdom and "999" in other parts of Europe. In areas where emergency services notification has been implemented, telephone users can call for any type of emergency assistance by dialing the ESN telephone number. In order for this service to be available, the Public Switched Telephone Network (PSTN) supplier in the area must route all such calls to an appropriate Call Answering Center. Many jurisdictions have installed enhanced systems that include technologies for reporting the calling party's Directory Number (DN) directly to the Call Answering Center. This information is then cross referenced to a location database which identifies the geographical location of the calling party.

The geographical information is used to dispatch the emergency services crew to the caller's location. In most cases the geographical database depends on a consistent and rigorously applied Civic Addressing System (CAS) which supplies a unique address for each possible originating telephone number. In practice, the CAS scheme is rarely implemented with 100% accuracy and often the CAS address label or sign is either misplaced or obstructed from view. In addition, mid to large sized commercial, industrial, educational and governmental institutions typically cannot participate in the ESN program as effectively since their internal PABX telephone systems have no practical way to report location information to the PSTN. An industrial site, for instance, may have hundreds of telephone instruments located in various buildings over several hectares yet a "9-1-1" call from any of them may identify only one location.

As a result of not quickly recognizing where the emergency site is located, either because the CAS addressing is incorrect or the address marker is not visible from the roadway or the emergency is declared from within a campus of buildings, emergency response time, which is of the essence in such situations, is undesirably increased. There exists, therefore, a need to supplement the emergency response tools to more effectively direct emergency responders to the actual emergency site.

SUMMARY OF THE INVENTION

It is an object of the invention to overcome some of the drawbacks of the current ESN programs implemented in sundry jurisdictions throughout the world. In general, the inherent limitations of the ESN program described above may be overcome by directing the responders to the exact location of the emergency using radio controlled visual/radio beacons.

The inventive system described in this disclosure implements just such a visual and radio beacon. The system detects the ESN telephone number as it is dialed and uses a radio control link to turn on a remotely located, battery operated strobe light and radio transmitter which alerts emergency responders. In addition, the system constantly checks for proper operation of the strobe light and its associated circuitry as well as the charge condition of the battery. Any anomalies encountered cause the system to initiate a telephone call to a central monitoring station and to report the details of the problem.

It is an object of the invention to provide a guidance mechanism by means of a visual beacon to assist responders to the exact location of an emergency scene when the ESN telephone number is dialed.

It is an object of the invention to provide a guidance mechanism by means of a radio beaconing transmitter which will have longer range than the visual beacon. The radio transmitter will guide the responders to the general location of the emergency scene by means of a radio direction finding receiver located in the responder's vehicle.

It is a further object of the invention to provide a testing and checking mechanism by which means the inventive system automatically checks itself for operational integrity. If anomalies are detected, the invention uses the connected telephone line to alert a central monitoring station. This is an important feature since the ESN system is an adjunct to a primary, first-call emergency system (ie. the ESN system). The inventive system also checks for in-range beacons when first powered up and automatically configures the beacon and decoder devices to not interfere with existing devices.

Further features of the invention include: (a) the ability to monitor other emergency and non-emergency alarm mechanisms such as smoke detectors, burglar alarm system, etc. and initiate a telephone call to a central monitoring point when an alarm is detected, (b) the ability to be integrated into a larger system of beaconing devices controlled from a central point such as the ESN Call Center which would allow the operator to control the beaconing mechanism on and off remotely and independently of the user's dialing the ESN number, (c) the ability to incorporate visual beacons of different colours and/or intensities such that the device could be used for other purposes such as a general locating, for example, for deliveries, (d) the ability to communicate via a wireless link to the local electrical power meter and receive power usage meter readings and other useful information which can then be intelligently reported via a telephone call to the central monitoring station, and (e) the ability to integrate the standard Dual Tone Multi-Frequency (DTMF) telephone instrument into various control systems in residential, industrial, institutional and commercial settings; by way of example, the DTMF instrument could be used to enter information into a remotely mounted alphanumeric sign. the information would be transmitted via the wireless link to the remote sign location.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
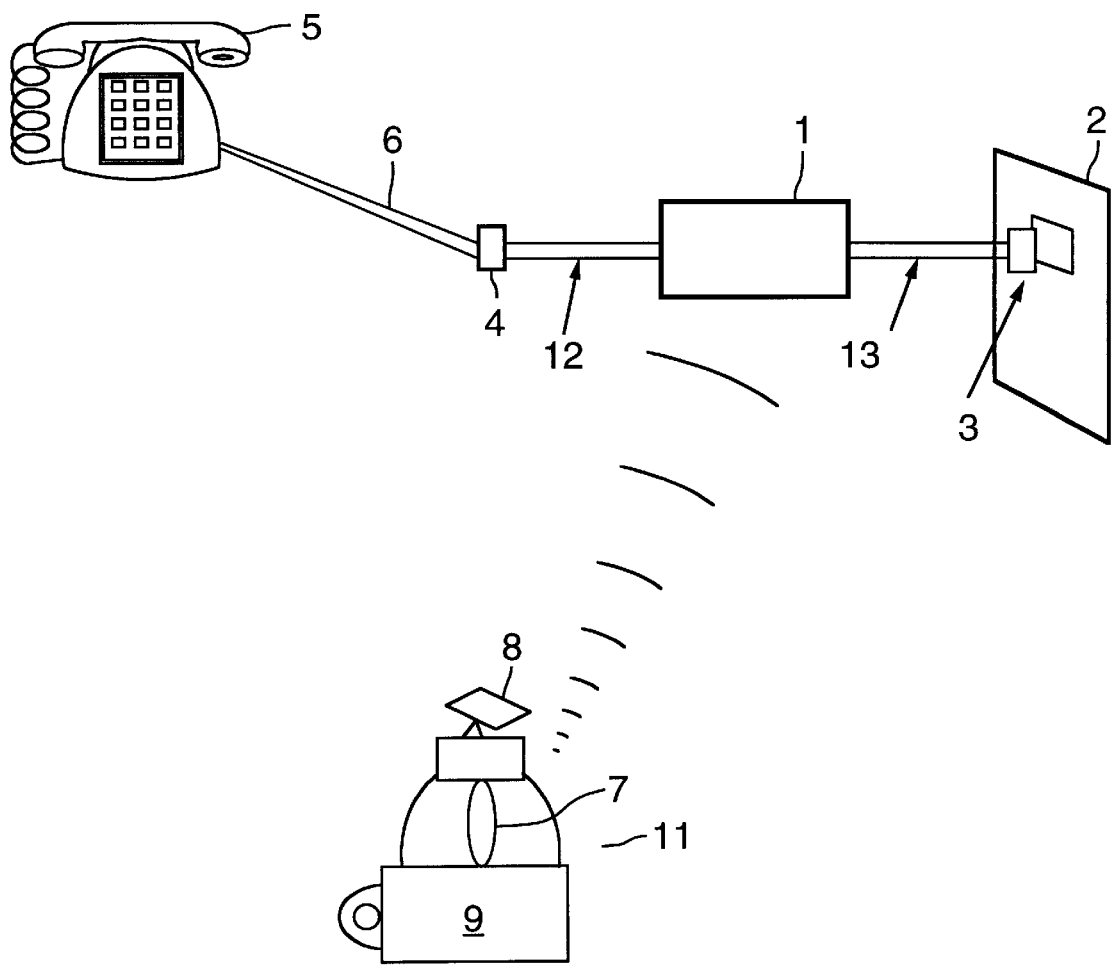
FIG. 1 is a general layout and setup drawing of the emergency guidance system.

With reference to FIG. 1, the emergency telephone number alerting device system comprises two primary component parts: (a) a decoder 1; and (b) a remote, radio controlled guide beacon 11. The decoder 1 is powered directly from the battery supply of the PSTN, while the beacon 11 is battery operated using internally mounted rechargeable cells (not shown). The rechargeable cells are charged by a low current solar panel 8 mounted at the top of the plastic case 9. The telephone instrument 5 causes DTMF or dial pulse signals to be sent via the telephone line 6 to the decoder 1. The decoder 1 detects these signals and determines if the proper ESN number has been entered. If the ESN number is detected, the decoder 1 sends a radio signal via the antenna 12 consisting of the telephone line segment out to the modular plug assembly 4. The other antenna 13 is used to receive radio signals from the beacon 11 device. The decoder 1 device is simply plug connected between the telephone instrument 5 and the standard wall mounted modular receptacle 2. The decoder 1 device in no way impedes or restricts the normal operation of the telephone instrument 5 or any other connected type approved device.

Figure 2:
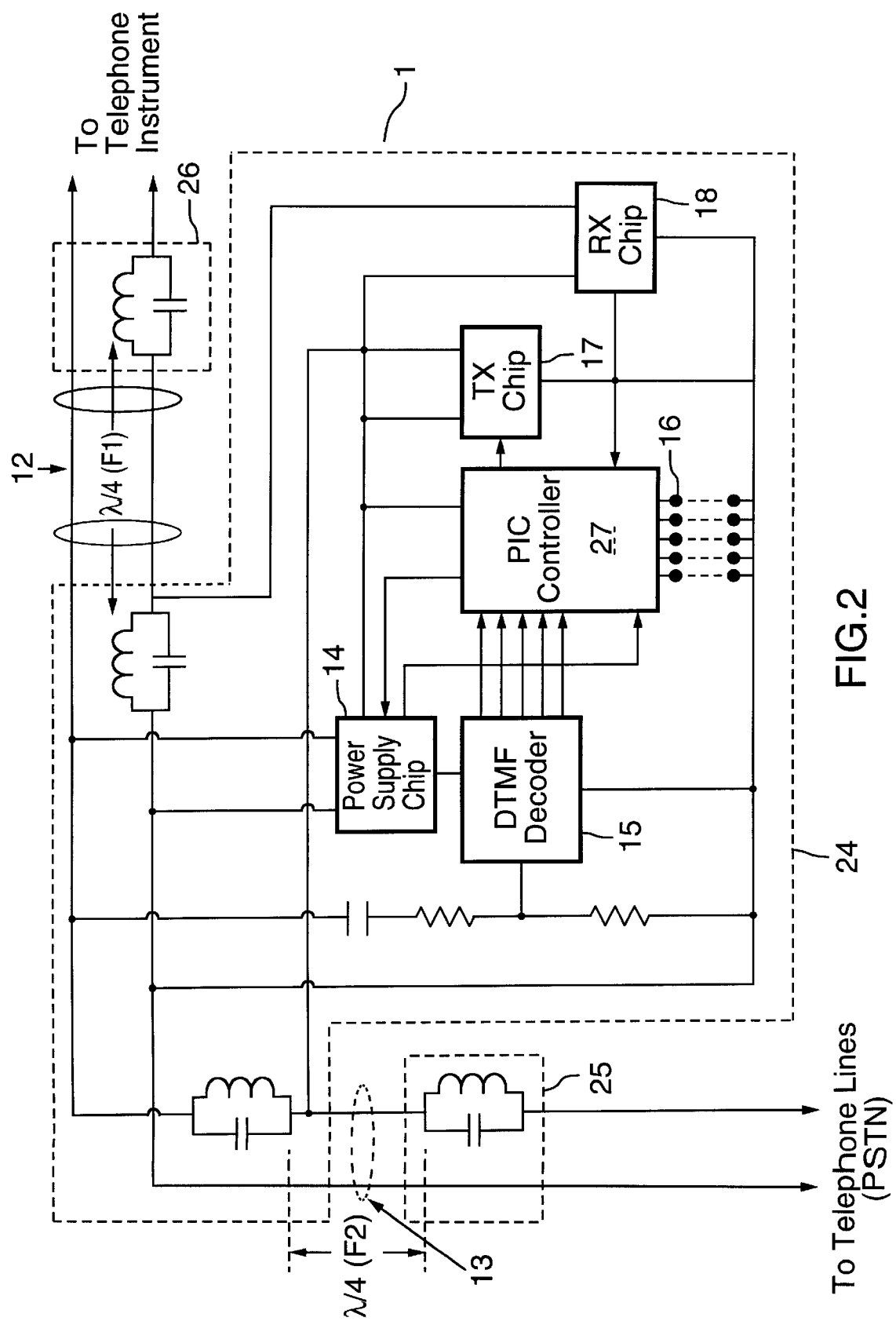
FIG. 2 is a block drawing of the electronics of the decoder device.
Figure 3:
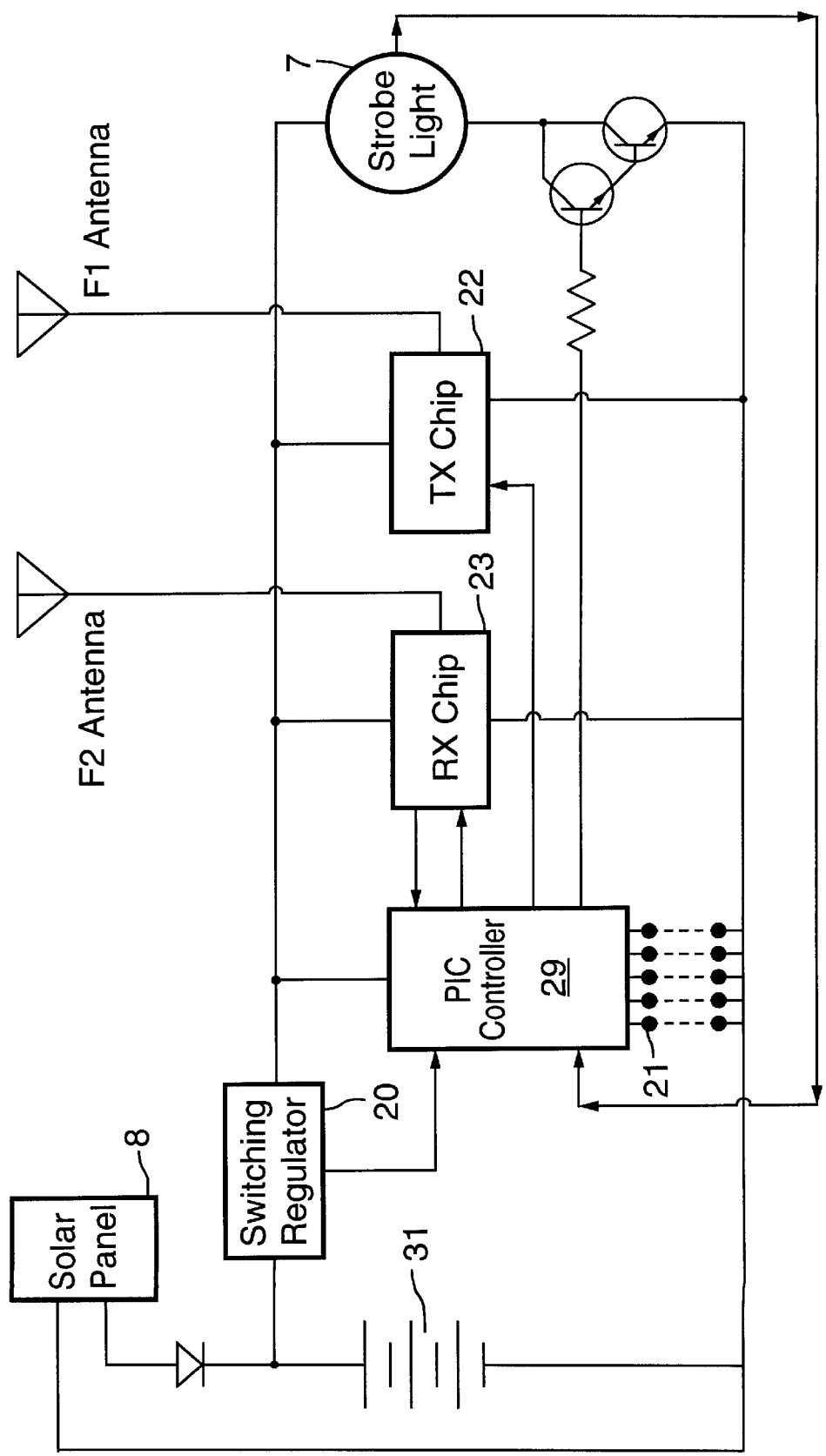
FIG. 3 is a block drawing of the electronics of the beacon device.

With reference to FIGS. 2 and 3, both the decoder 1 and the beacon 11 make use of imbedded process microcontroller (PIC) chips 27 and 29 that furnish local intelligence for control purposes. The PIC chips are interfaced to various peripheral circuits in each device.

As shown in FIG. 2, the decoder 1 uses: (a) a separate DTMF receiver 15 that is optimized for connection to standard PSTN telephone lines via the modular plug 3 (not shown), (b) a line powered switching power supply chip 14 which also detects the offhook status of the telephone instrument 5 (not shown), (c) a series of selectable jumpers 16 that determine the TX/RX address of the device, (d) a monolithic transmitter (TX) chip 17, and (e) a monolithic receiver (RX) chip 18.

As shown in FIG. 3, the beacon 11 uses: (a) a high brilliance electrical strobe light 7, (b) a battery powered switching power supply module 20, (c) a series of selectable jumpers 21 that determine the TX/RX address of the device, (d) a monolithic transmitter (TX) chip 22, (e) a monolithic receiver (RX) chip 23, and (f) a solar panel 8 to charge the internal battery 31.

The software programming in the PIC chips allows the system to support the following functionality:

1. accurate, reliable detection of the emergency services notification dial sequence (eg. "911");
2. detection of onhook status which is used to reset the dial sequence decoder logic resulting in fast device response times to user dialing;
3. rejection of dial sequences that have the ESN string imbedded eliminates false responses (eg "123-9119");
4. reliable detection of strobe light operation with two-way handshake reporting of both 'circuit-on' and 'circuit-off' conditions
5. automatic multiple retries if strobe fails to respond;
6. user warning tone if problems are detected;
7. continuous background testing of RF path and strobe light availability;
8. a time-out-timer automatically turns off the strobe light and RDF transmitter after a configurable time (ie. one hour);
9. the PIC in the beacon automatically checks the battery condition and reports to the decoder unit—low battery indication is indicated by (a) a short tone burst at the beginning of each call, and (b) a outbound call placed by the device to a central monitoring point;
10. selectable user address eliminates potential interference between units that are installed in close proximity—these jumpers over-ride the device's internal interference avoidance algorithm;
11. both decoder and beacon devices make extensive use of "sleep mode" operation in order to reduce power demand, thus increasing battery life and decreasing the power demand from the PSTN;
12. the beacon device is designed to work over a temperature range of −30° C. to +60° C. and up to 100% (condensing) moisture.

With reference to FIG. 2, the decoder 1 is mounted in a moulded plastic case 24 with two axial flying wire connections fitted on either end. Each wire terminates on an RJ style connector—male on the PSTN side 25; female on the telephone instrument side 26. The RJ connectors are mounted in tubular fixtures that also contain capacitor/inductor traps tuned to the appropriate frequency for operation of either the receiver or transmitter. This scheme allows the flying leads to behave as ¼ wavelength antennas 12, 13 presenting the required 50W impedances to the transmitter and receiver chips, respectively. The traps have no effect at audio frequencies.

The DTMF decoder IC 15 boasts a wide dynamic range, low power consumption and proven reliability in noisy conditions. It produces a BCD output along with a data valid trigger. The input to the DTMF decoder is capacitively coupled from the telephone line. Two resistors are used to set the maximum signal level impinging on the DTMF decoder from the telephone line. The decoder 1 also detects dial pulse dialing using the off-hook indication from the power supply chip 14.

The power supply chip 14 is a switching regulator that takes the voltage directly from the PSTN telephone line (ie. between 15 to 52 volts) and produces the lower voltages required by the circuits in the decoder 1 (ie. 3.3 volts and 5 volts). The switching regulator allows highly efficient voltage regulation which reduces power consumption from the PSTN line and provides isolation of the decoder 1 from the telephone environment.

The PIC controller 27 is an integrated microprocessor which includes a 4 MHz clock generator, a One-Time Programmable (OTP) ROM memory, scratch pad RAM memory, an independent watch-dog timer, input/output (I/O) ports, a number of programmable timers, etc. The PIC controller 27 works from a single ended 3.3 volt power source. The PIC controller 27 supports "sleep mode" which disables all the peripheral devices and causes the IC to go into an extremely low current consumption mode for a predetermined time. The program causes the PIC controller 27 and its peripherals to wake up on a scheduled basis and generate a series of background checks including requesting the battery condition of the beacon device. The offhook indication from the power supply chip 14 also causes the PIC controller 27 and its peripherals to become active, ready to detect the DTMF digits and act accordingly.

The address register 16 sets an internal sequence used to encode the transmitter sequences to eliminate interference with other alarm-beacon systems in use in the local vicinity. The address register also sets the receiver decoder address.

The PIC controller 27 can also send audio tones to the telephone line to: (a) send modem tone information to a central monitoring station via a telephone call, and (b) to send appropriate comfort tones to the user of the telephone instrument 5. These features are a function of the programming of the PIC controller 27.

The TX Chip 17 is a monolithic device capable of generating power output of approximately 0 dBm which is sufficient for a transmit range from the decoder 1 of greater than 200 meters with standard ¼ wavelength antennas. The modulation method used is On-Off Keying (OOK) with appropriate address and redundancy checking overhead.

The RX Chip 18 is a monolithic device which uses Surface Acoustic Wave (SAW) filters and switched delay line technologies to implement an inexpensive and sensitive receiver. The device implements a 'squelch' circuit that eliminates Gaussian noise input to the PIC controller 27.

The two antennas 12 and 13 are formed by the axial leads which terminate in the plastic enclosures 25 and 26 containing the molded RJ connectors and appropriate RF traps for the two frequencies used. This configuration allows the beacon 11 and decoder 1 to communicate in full duplex operation and allows the decoder 1 to cancel the beaconing operation even if the beacon 11 is sending high power radio beacon messages.

With reference to FIG. 3, the beacon 11 is contained in a moulded plastic case which holds the strobe light 7 and its circuitry and supports the solar panel 8. The enclosure has a separate battery compartment for the rechargeable battery 31 and is sealed with a rubber O-Ring around its perimeter ensuring weather-tightness.

The battery 31 feeds a switching regulator module 20 which produces the necessary voltage sources for the various component parts of the beacon 11. The module has an internal zener diode sensor (not shown) which fires if the battery voltage drops below a preset level. This trigger signal is reported to the on-board PIC 29 which formats a warning message to the decoder 1.

The PIC 29 uses a similar address coding arrangement as in the decoder 1. OOK information from the RX chip 23 controls whether the PIC 29 turns on or off the strobe light 7 and TX chip 22. The message format can direct the PIC 29 to: (a) activate the strobe light 7 only, (b) activate the TX chip 22 only, or (c) activate both together. Other messages are available to cause the strobe 7 and TX chip 22 to stop beaconing. To conserve battery power the PIC 29 uses "sleep or power down mode". In this mode, the PIC 29 draws very little power from the battery supply. In addition the control line to the receiver chip 23 causes it to enter a low power "sleep" mode as well. Both the TX chip 22 and the strobe light 7 circuitry have low quiescent power demands so they are not forced into "sleep" mode by the PIC 29.

The PIC 29 senses the presence of firing data in the strobe light 7. This information indicates that the strobe light 7 is functioning up to, but not including, the point of actually discharging the lamp. This mechanism is used in the background to allow the decoder 1 to test operation of the beacon 11 without actually causing the strobe light 7 or the TX chip 22 to be fully activated. The fire indication works by sensing the voltage across an internal zener diode (not shown) connected to the strobe capacitor. To start the test sequence, the PIC 29 energizes the strobe circuit for a short time. If the voltage across the strobe capacitor increases above the zener diode level, a trigger is returned to the PIC 29. This is an indication of proper strobe operation. The PIC 29 communicates to the decoder 1 via the TX chip 22 to indicate the strobe circuit status.

In the beaconing mode, the TX chip 22 sends at a higher power level (approximately +10 dBm to +20 dBm) using short pulses in prolonged bursts. These bursts are received by a sensitive, portable Radio Direction Finding (RDF) receiver carried by emergency response personnel. The approximate range of the RDF system is 1 to 2 kilometers. The short pulses are designed to reduce the current consumption from the battery.

In another embodiment of the invention, an external receiver tuned to the local power utility's radio network implements a utility power meter reading service. This is accomplished by sending low speed modem data via the utility's radio system. This data is detected by all suitably equipped alerting devices within range of the radio sites. The modem data is formatted to individually address the particular devices set up to read meters. If the data is decoded and recognized by the decoder 1 as directing its response, then the decoder carries out the following: (a) check that the telephone line 3 is free, (b) dial a predetermined number to the utility meter reading system, (c) download information that the local wireless system has recovered from the utility meter, and (d) hang up the telephone. The system will use a handshaking protocol to eliminate possible collisions with telephone users. The decoder will be able to sense local offhook conditions. Any such condition will cause the decoder to drop its own call. The user will not hear dial tone and so will cycle the hook switch which will restore normal operation. The utility meter data is reported to the decoder 1 from the utility meter using the same local wireless connectivity as described previously.

In a further embodiment of the invention, the decoder and the beacon will implement a special protocol to automatically choose a non-interfering address. This is implemented by specifying a common receive and transmit address (ie. 00000) for new units being manufactured. When first installed and powered up, the decoder will send a special message to the common address and wait for a response from any beacon units that are in range and have the common address (ie. a beacon that has never communicated with a decoder). The decoder and beacon will then negotiate an address which is checked by the decoder to insure that there are no other beacon units within range using the same address. Once an address has been verified, the beacon and decoder use it from that point onwards (unless reset by pulling a PIC pin low—typically a factory function). The address(es) chosen during the negotiation will be at random (ie. a function of the devices' serial number).

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, the decoder device may be able to dial DTMF digits on the telephone line (PSTN) thus enabling monitored operation from a central monitoring station. Thus the decoder could dial the monitoring station and send data to indicate that the beacon 11 battery is low or that the beacon 11 circuit has failed (ie. discovered by the background testing process). Further on this variation, the decoder may communicate with other devices besides the beacon 11. This will allow the invention to be used as a wireless alarm system (eg. smoke detectors, entry alarms, industrial information, utility meters, etc.)

What is claimed as the invention is:

1. An emergency telephone number alerting and guidance process to guide emergency responders to the exact scene of an emergency declared by dialing the emergency services notification (ESN) telephone number comprising the following steps:
(a) a decoder detecting the ESN telephone number as it is dialed on the telephone instrument;

(b) the decoder communicating an ESN detection signal via a low power, unlicenced radio link to a remotely located guidance beacon assembly informing it of the ESN detection; and, (c) the beacon responding to the ESN detection signal by initiating a distress guidance signal, said distress guidance signal comprising a visual strobe light and a pulsating radio signal which signal may be used by a radio direction finder, said distress guidance signal's operational status is verified by:

(i) the beacon, following a command from the decoder, energizing a strobe light electronic circuit for a short time without activating either the strobe light or the pulsating radio signal;

(ii) checking if the voltage across the circuit is sufficient to activate the strobe light thus checking the electronic circuitry;

(iii) transmitting a status signal via a radio link to the decoder thus checking the RF transmitter;

(iv) the decoder receiving the status signal; and, (v) reporting of any anomalous condition thus detected by the decoder to a centralized monitoring point by the decoder generating a DTMF or dial pulse call via the telephone line.

2. A process as claimed in claim 1, wherein said decoder alerts an operational warning when any of the following occur:

(a) the beacon's battery voltage dropping below a set level as reported from the beacon via a wireless message;

(b) the beacon's strobe light circuitry failing to produce sufficient voltage to cause the strobe to fire as reported from the beacon via a wireless message;

(c) the of communication is lost with the beacon for any reason as determined by lack of wireless message response from the beacon; or, (d) failure of the DTMF decoder to detect test sequences output by the decoder's PIC controller.

3. An emergency telephone number alerting and guidance system as claimed in claim 1, where there is included the step of monitoring and reading at least one of a power or water usage meter.

4. An emergency telephone number alerting and guidance system to guide emergency responders to the exact scene of an emergency declared by dialing the emergency services notification (ESN) telephone number comprising:

a decoder means to detect the ESN telephone number as it is dialed on the telephone instrument and to transmit an ESN detection signal via a low power, unlicenced radio link, a remotely located guidance beacon means to receive said ESN detection signal from the decoder means, configured to respond to the ESN detection signal by initiating a distress guidance signal, said distress guidance signal comprising a visual strobe light and a pulsating radio signal which signal may be used by a radio direction finder, said beacon means having an electronic circuit that comprises:

a high brilliance electrical strobe light; a battery powered switching power supply module to produce the necessary voltages for the various components; an integrated microprocessor; a series of selectable jumpers that determine the TX/RX address of the device; a monolithic transmitter chip that, when required, sends short pulses in prolonged bursts to be received by a sensitive radio direction finder; a monolithic receiver chip that directs the integrated microprocessor to activate or deactivate the strobe light only, the transmitter chip only or both together.

5. An emergency telephone number alerting and guidance system as claimed in claim 4, where there is included a communication means for monitoring and reading at least one of a power or water usage meter.

* * * * *

UNITED STATES PATENT AND TRADEMARK OFFICE
CERTIFICATE OF CORRECTION

PATENT NO.  : 5,960,061
DATED       : September 28, 1999
INVENTOR(S) : Fahie, et al It is certified that error appears in the above-identified patent and that said Letters Patent is hereby corrected as shown below:

Column 7, line 34, (c) the of communication is lost with the beacon for any
        reason as determined by lack of wireless message response
        response from the beacon; or, should be corrected as follows:

(c) communication is lost with the beacon for any
        reason as determined by lack of wireless message response Signed and Sealed this Eighteenth Day of July, 2000

*Attest:*

*Attesting Officer*

Q. TODD DICKINSON

*Director of Patents and Trademarks*